United States Patent
Khial et al.

(10) Patent No.: US 9,026,377 B2
(45) Date of Patent: May 5, 2015

(54) METHOD AND SYSTEM FOR DETECTING FORCES ON AIRCRAFT

(75) Inventors: Karim Khial, Seymour, CT (US); James J. Howlett, North Haven, CT (US); Vineet Sahasrabudhe, Cheshire, CT (US); Naji S. Yakzan, Orange, CA (US)

(73) Assignee: Sikorsky Aircraft Corporation, Stratford, CT (US)

( * ) Notice: Subject to any disclaimer, the term of this patent is extended or adjusted under 35 U.S.C. 154(b) by 1094 days.

(21) Appl. No.: 12/894,365

(22) Filed: Sep. 30, 2010

(65) Prior Publication Data
US 2011/0098967 A1 Apr. 28, 2011

Related U.S. Application Data

(60) Provisional application No. 61/255,547, filed on Oct. 28, 2009.

(51) Int. Cl.
*G01L 1/00* (2006.01)
*G05D 1/00* (2006.01)

(52) U.S. Cl.
CPC .................................. *G05D 1/0066* (2013.01)

(58) Field of Classification Search
None
See application file for complete search history.

(56) References Cited

U.S. PATENT DOCUMENTS

| | | | |
|---|---|---|---|
| 3,499,500 A | 3/1970 | Harding | |
| 4,243,024 A * | 1/1981 | Crosbie et al. | 600/19 |
| 4,638,437 A | 1/1987 | Cleary et al. | |
| 4,815,678 A | 3/1989 | Gawne | |
| 5,167,385 A | 12/1992 | Hafner | |
| 5,446,666 A | 8/1995 | Bauer | |
| 5,826,833 A | 10/1998 | Evans et al. | |
| 5,927,646 A | 7/1999 | Sandy et al. | |
| 6,052,069 A | 4/2000 | Silder, Jr. et al. | |
| 6,189,836 B1 | 2/2001 | Gold et al. | |
| 7,093,795 B2 | 8/2006 | Lindahl et al. | |
| 2006/0047387 A1 * | 3/2006 | Izawa et al. | 701/37 |
| 2007/0170313 A1 * | 7/2007 | Delaplace | 244/183 |

* cited by examiner

*Primary Examiner* — Aditya Bhat
(74) *Attorney, Agent, or Firm* — Cantor Colburn LLP

(57) ABSTRACT

A method for sensing a force applied to an aircraft includes receiving a derivative of the acceleration of a motion of a portion of the aircraft, determining whether the derivative of the acceleration of the motion of the portion of the aircraft exceeds a threshold, and outputting an indication that a force has been applied to the portion of the aircraft responsive to determining that the derivative of the acceleration of motion of the portion of the aircraft exceeds the threshold.

18 Claims, 5 Drawing Sheets

METHOD AND SYSTEM FOR DETECTING FORCES ON AIRCRAFT

CROSS REFERENCE TO RELATED APPLICATIONS

This application claims the benefit of U.S. Provisional Application No. 61/255,547, filed Oct. 28, 2009.

BACKGROUND OF THE INVENTION

The subject matter disclosed herein relates to detecting impact forces on aircraft, and in particular to detecting landing gear impact on aircraft.

Aircraft such as, for example, rotary wing aircraft and fixed wing aircraft use a variety of sensors to provide feedback to aircraft control systems. Detecting when a force, such as weight, is applied to the landing assemblies or other portions of an aircraft provides useful feedback to aircraft systems. Previous systems used sensors located on each landing assembly to determine whether weight was applied to a landing assembly. The use of these sensors increased the weight and complexity of the aircraft, and had limited fidelity in sensing actual weight applied to a landing assembly.

BRIEF DESCRIPTION OF THE INVENTION

According to one aspect of the invention, a method for sensing a force applied to an aircraft includes receiving a derivative of the acceleration of a motion of a portion of the aircraft, determining whether the derivative of the acceleration of the motion of the portion of the aircraft exceeds a threshold, and outputting an indication that a force has been applied to the portion of the aircraft responsive to determining that the derivative of the acceleration of motion of the portion of the aircraft exceeds the threshold.

According to another aspect of the invention, a method for sensing a takeoff of an aircraft includes receiving a rate of change in the vertical motion of the aircraft, determining whether the rate of change in the vertical motion of the aircraft exceeds a first threshold, integrating the rate of change in the vertical motion of the aircraft and outputting a virtual altitude signal, responsive to receiving the indication that the portion of the aircraft is contacting a surface, delaying the virtual altitude signal through a discrete low pass filter and outputting the delayed virtual altitude signal, subtracting the delayed virtual altitude signal from the virtual altitude signal to output an altitude perturbation signal, determining whether the altitude perturbation signal exceeds a second threshold value, and outputting an indication that the portion of the aircraft is not contacting the surface responsive to determining that the rate of change in the vertical motion of the aircraft exceeds the first threshold and determining that the altitude perturbation signal exceeds the second threshold value.

According to yet another aspect of the invention, a system for sensing a force applied to an aircraft includes a sensor, and a processor operative to receive a signal indicative of an acceleration of a motion of the aircraft, apply a kinematic equation to the first signal to transform the indication of the acceleration of the motion of the aircraft to indicate an acceleration of a motion of a portion of the aircraft, calculate a derivative of the acceleration of the motion of the portion of the aircraft, determine whether the derivative of the acceleration of the motion of the portion of the aircraft exceeds a threshold, output an indication that a force has been applied to the portion of the aircraft responsive to determining that the derivative of the acceleration of the motion of the portion of the aircraft exceeds the threshold.

These and other advantages and features will become more apparent from the following description taken in conjunction with the drawings.

BRIEF DESCRIPTION OF THE DRAWING

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
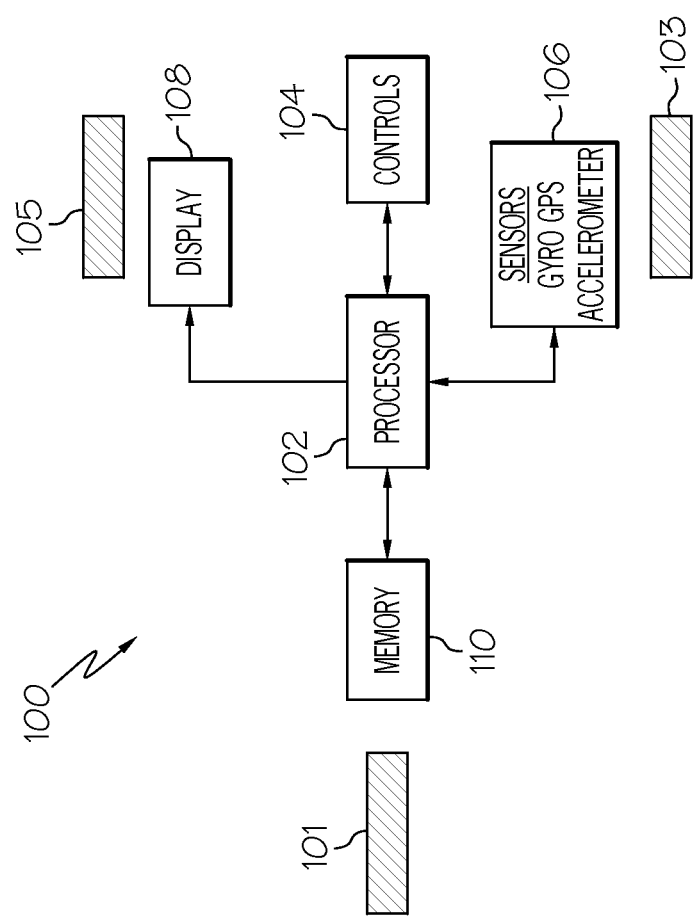
FIG. 1 illustrates a block diagram of an exemplary embodiment of an aircraft 100.

FIG. 1 illustrates a block diagram of an exemplary embodiment of an aircraft 100. The aircraft 100 includes a nose landing assembly 101, a left landing assembly 103, and a right landing assembly 105. The landing assemblies may include, for example, a landing gear assembly that includes an inflatable wheel, or any other device that is operative to contact a landing surface. For example a skid assembly may be used, and portions of the skid assembly may be designated as contact points similar to the gear described above. The aircraft 100 includes a processor 102 that is communicatively connected to flight controls 104 and sensors 106 that may include, for example, a gyro sensor, one or more accelerometers, a global positioning system (GPS), or any other inertial sensors. The processor 102 may also be communicatively connected to a memory 110 and a display 108.

Figure 2:
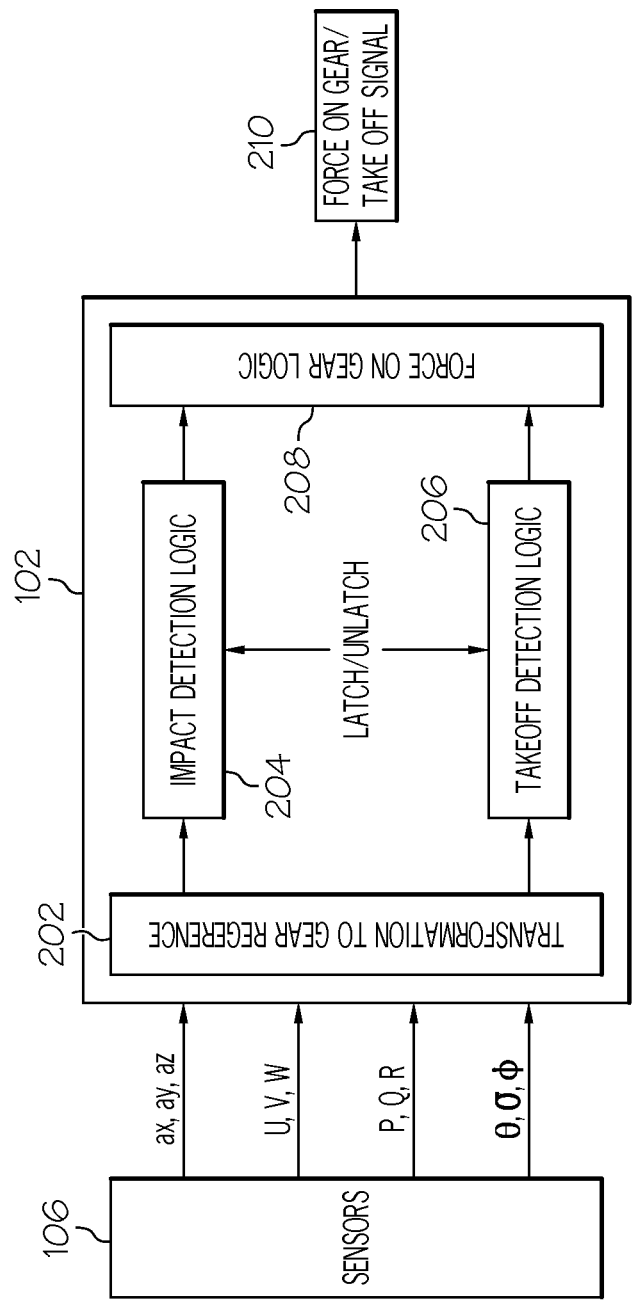
FIG. 2 illustrates a block diagram of an exemplary embodiment of logic performed by the processor of FIG. 1.

FIG. 2 illustrates a block diagram of an exemplary embodiment of logic performed by the processor 102. In this regard, the processor 102 receives input data from the sensors 106. The input includes acceleration (ax, ay, and az) from, for example, an accelerometer, velocity (U, V, W) from, for example, a GPS or derived from an accelerometer, orientation (pitch, roll, yaw; θ, σ, φ) from for example, a gyroscope (gyro), and a rate of change in orientation (P, Q, R) from, for example, a gyro. In block 202 the signals are processed to mathematically transform vectors associated with the signals at the location of the sensors to positions associated with each gear. For example, the accelerometer may be located close to the center of mass of the aircraft 100, however the gear are located geometrically in different locations. The geometric relationship between the accelerometer and a particular gear may be measured or known, allowing the input from the accelerometer to be mathematically transformed using a kinematic relationship such that the transformed inputs represent acceleration at a particular gear. The processed sensor data is sent to impact detection logic 204, for landing evolutions, or takeoff detection logic 206, for takeoff evolutions. The impact detection logic 204 and takeoff detection logic 206 output a signal to the force on gear logic 208 that outputs a force on gear signal 210. The force on gear signal 210 indicates that a weight on wheel force has been applied to a gear. The indication provides information to the aircraft 100 operator and/or automatic control systems of the aircraft 100 that assists in operating the aircraft. Particularly, the weight on wheel force may indicate that the aircraft has landed or has taken off from a landing area.

Figure 3:
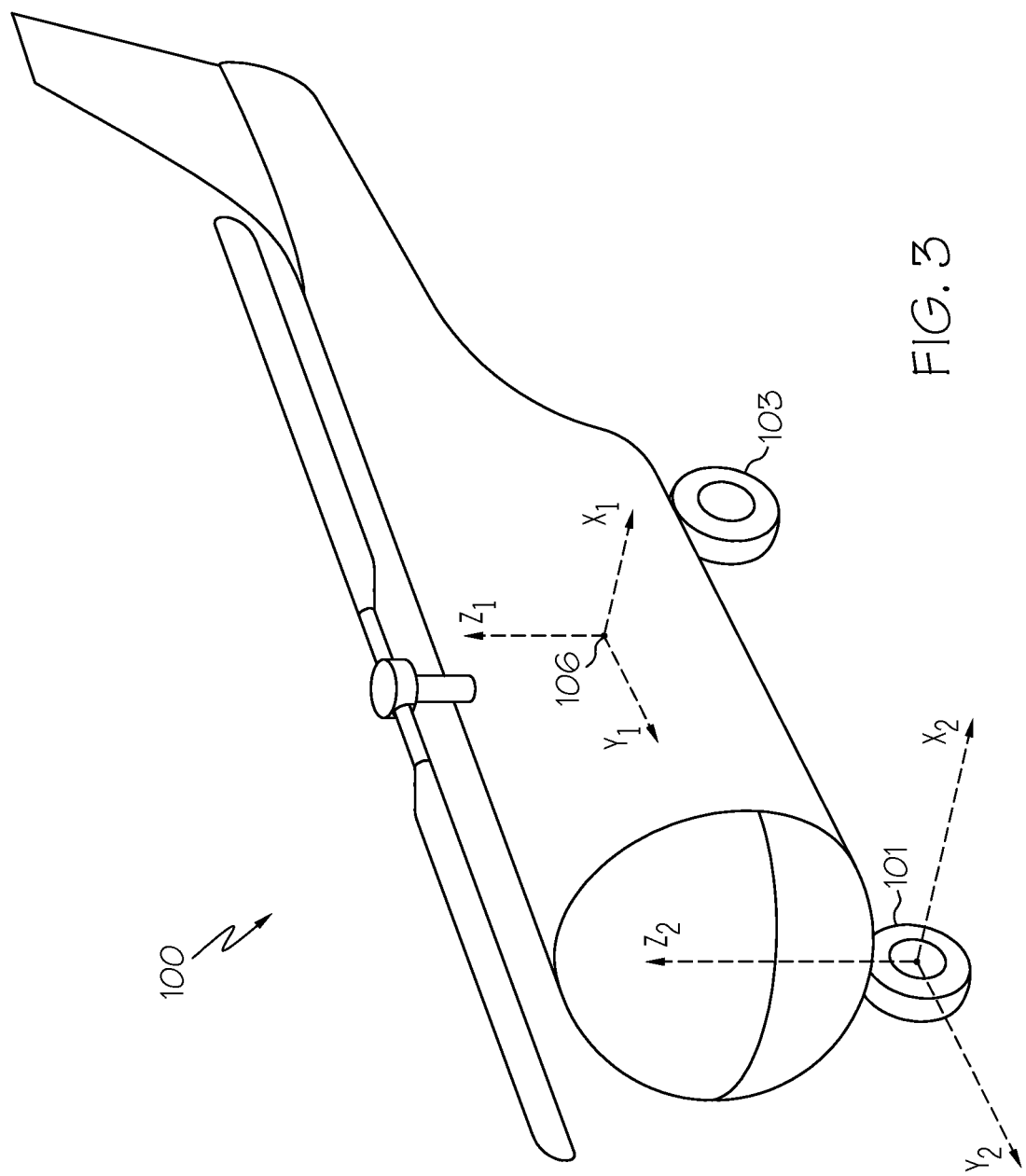
FIG. 3 illustrates an example of the geometric relationship between a sensor and a nose landing assembly of FIG. 1.

FIG. 3 illustrates an example of the geometric relationship between a sensor 106 and the nose landing assembly 101 including an example of coordinate systems that are associated with the sensor 106 and the nose landing assembly 101. A kinematic transform may be used to mathematically associate the data collected by the sensor 106 to the nose landing assembly 101. Thus, for example, a movement sensed by the sensor 106 in the $X_1$ direction, may be kinematically transformed to an associate the movement with a force applied to the nose landing assembly 101. A vector representing the force applied to the nose landing assembly 101 may be plotted on the $X_2, Y_2, Z_2$ coordinate system.

Figure 4:
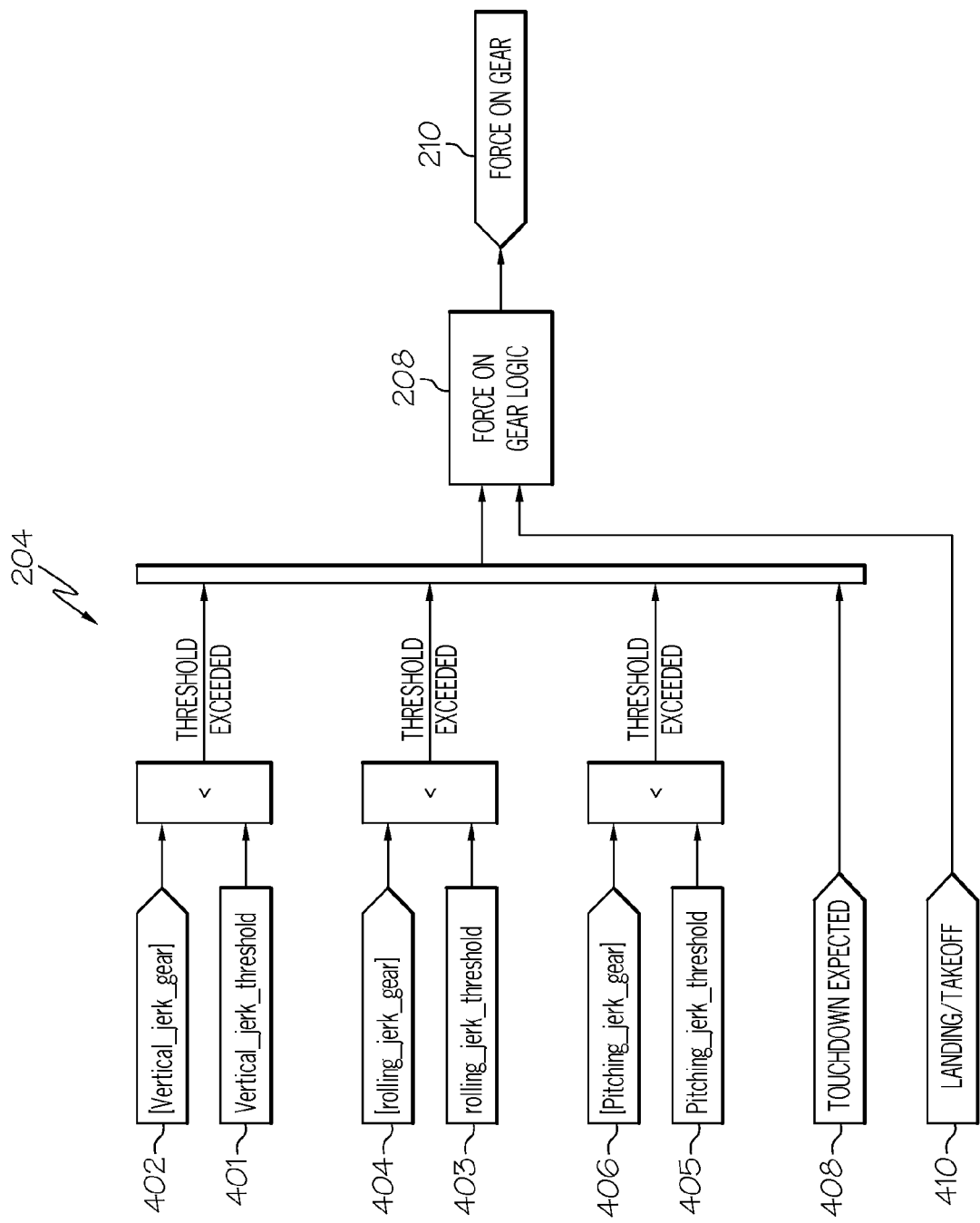
FIG. 4 illustrates a block diagram of exemplary impact detection logic of FIG. 2.

FIG. 4 illustrates a block diagram of exemplary impact detection logic 204 (of FIG. 2) used to determine if a force has been applied to a gear on the aircraft 100. The logic 204 may be applied in a similar manner to each gear. For exemplary purposes, the description below will describe logic used to determine whether a force or weight has been applied to the nose landing assembly 101 (of FIG. 1), however the logic may be applied simultaneously to any landing assembly or portion of a landing assembly. In this regard, if the aircraft landing is expected, a signal 408 is output that cues the impact detection logic 204. Vertical jerk data 402 is compared to a vertical jerk threshold value 401. The vertical jerk data is the derivative of the acceleration in a vertical direction. If the vertical jerk data 402 is greater than the vertical jerk threshold value 401 a signal indicating that the threshold is exceeded is output. Rolling jerk data 404 is compared to a rolling jerk threshold value 403. Rolling jerk data 404 is a derivative of the acceleration of the roll. If the rolling jerk data 404 is greater than the rolling jerk threshold value 403, a signal indicating that the threshold is exceeded is output. Pitching jerk data 406 is compared to a pitching jerk threshold 405. The pitching jerk data 406 is a derivative of the acceleration of the pitch. If the pitching jerk data 406 is greater than the pitching jerk threshold value 405, a signal indicating that the threshold is exceeded is output. The signals are output to an AND logic that determines whether each of the three thresholds have been exceeded. The force on gear logic 208 outputs a force on gear signal 210, set to true, that indicates that a force has been applied to the nose landing assembly 101. If a takeoff signal 410 is output (true) by the takeoff detection logic 206, it resets the force on gear signal 210 to false.

The illustrated embodiment above describes the logic associated with the nose landing assembly 101, however the logic may be used to determine an impact, force, or weight that is applied to any gear, or location on the aircraft 100. Regarding the nose landing assembly 101, a force from the ground (or weight) creates positive pitching signals and negative vertical jerk signals. A force (or weight) on the left gear 103 creates a positive rolling jerk signal and negative pitching jerk and negative vertical jerk signals. A force (or weight) on the right gear 105 creates negative rolling jerk, negative pitching jerk, and negative vertical jerk signals. The thresholds may be determined by design parameters, and the geometry of the aircraft 100.

Figure 5:
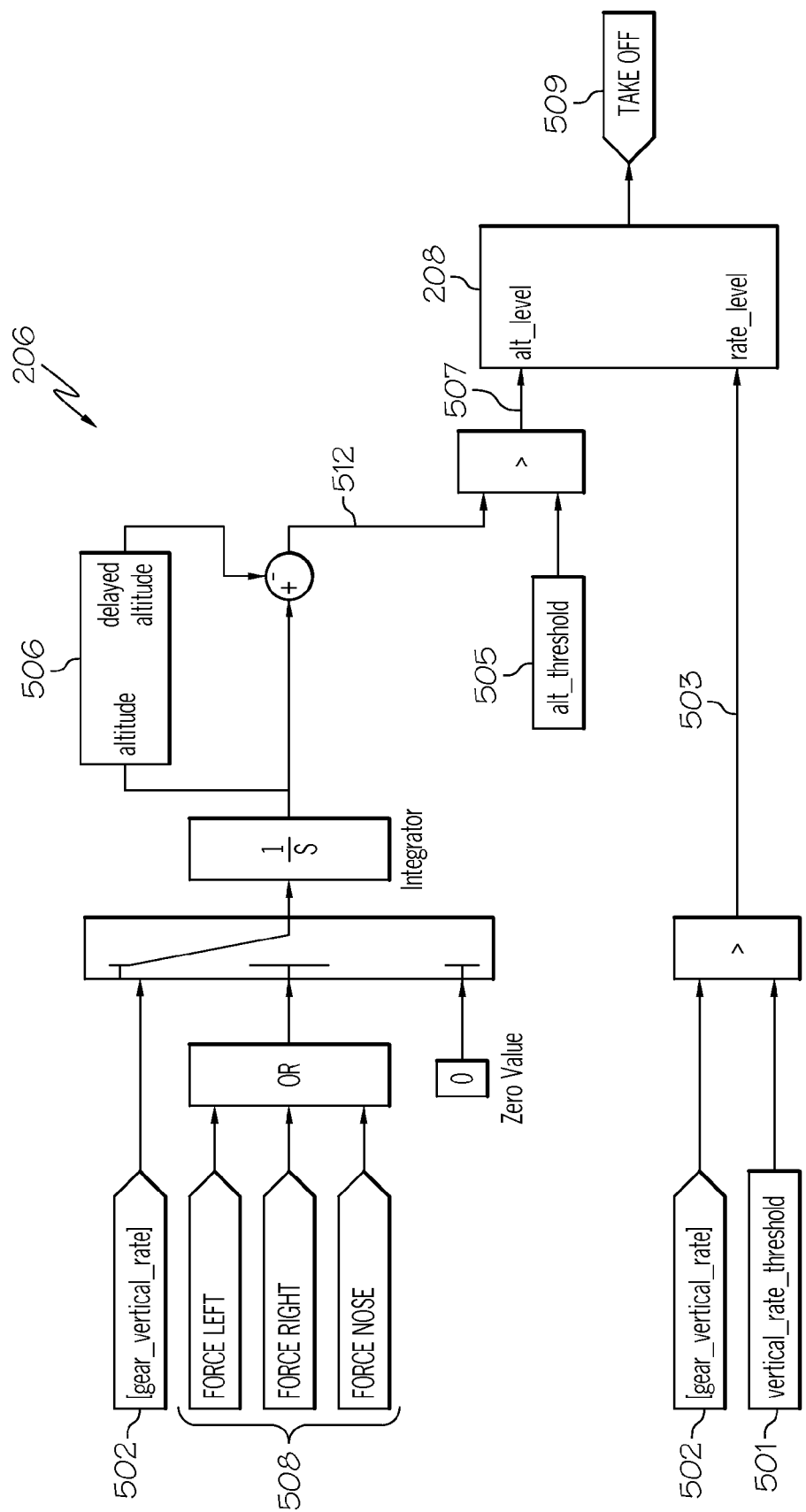
FIG. 5 illustrates a block diagram of exemplary takeoff detection logic of FIG. 2.

FIG. 5 illustrates a block diagram of exemplary embodiment of takeoff detection logic 206 (of FIG. 2). A vertical rate of acceleration of the gear 502 is compared with a vertical rate threshold 501. A signal 503 is output if the vertical rate of acceleration of the gear 502 is greater than the vertical rate threshold 501. The forces on the gear signals 508 are compared using OR logic, if either gear force signal is true, indicating ground contact condition, the vertical rate of the gear 502 is integrated to output a virtual altitude signal 510. The signal 510 is delayed through a discrete low pass filter in block 506 outputting a delayed virtual altitude signal 511. Altitude perturbation signal 512 is computed by subtracting the delayed virtual altitude signal 511 from the virtual altitude signal 510 and then is compared to an altitude threshold 505. If the value of the altitude perturbation signal 512 is greater than the altitude threshold 505, a signal 507 is output. If the signals 503 and 507 are received at the force on ground logic 208, takeoff signals 509 and 410 are output (set to true). If neither gear force signal is true, indicating in air condition, the integrator input is set to zero thus disabling the take off detection.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method for sensing a force applied to an aircraft comprising:
   receiving a derivative of the acceleration of a motion of a portion of the aircraft;
   determining, by a processor, whether the derivative of the acceleration of the motion of the portion of the aircraft exceeds a threshold; and
   outputting, by the processor, an indication that a force has been applied to the portion of the aircraft responsive to determining that the derivative of the acceleration of motion of the portion of the aircraft exceeds the threshold, wherein the force applied to the portion of the aircraft is a weight on wheel force indicating landing of the aircraft;
   the processor resetting the indication that the force has been applied to the portion of the aircraft upon receiving a takeoff signal, the takeoff signal indicating the aircraft has taken flight.

2. The method of claim 1, wherein the derivative of the acceleration of the motion of the portion of the aircraft is the derivative of the acceleration of a vertical motion of the portion of the aircraft and the threshold is associated with the vertical motion of the portion of the aircraft.

3. The method of claim 2, wherein the derivative of the acceleration of the vertical motion of the portion of the aircraft is calculated by:
   receiving a first signal indicative of the acceleration of the vertical motion of the aircraft from a sensor;
   applying a kinematic equation to the first signal to transform the indication of the acceleration of the vertical motion of the aircraft to indicate the acceleration of the vertical motion of the portion of the aircraft; and
   taking a derivative of the acceleration of the vertical motion of the portion of the aircraft.

4. The method of claim 2, wherein the threshold is a negative value.

5. The method of claim 1, wherein the derivative of the acceleration of the motion of the portion of the aircraft is the derivative of the acceleration of a rolling motion of the portion of the aircraft and the threshold is associated with the rolling motion of the portion of the aircraft.

6. The method of claim 5, wherein the derivative of the acceleration of the rolling motion of the portion of the aircraft is calculated by:
   receiving a second signal indicative of the acceleration of the rolling motion of the aircraft from a sensor;
   applying a kinematic equation to the second signal to transform the indication of the acceleration of the rolling motion of the aircraft to indicate the acceleration of the rolling motion of the portion of the aircraft; and
   taking a derivative of the acceleration of the rolling motion of the portion of the aircraft.

7. The method of claim 5, wherein the portion of the aircraft is a left landing assembly and the threshold is a positive value.

8. The method of claim 5, wherein the portion of the aircraft is a right landing assembly and the threshold is a negative value.

9. The method of claim 1, wherein the derivative of the acceleration of the motion of the portion of the aircraft is the derivative of the acceleration of a pitching motion of the portion of the aircraft and the threshold is associated with the pitching motion of the portion of the aircraft.

10. The method of claim 9, wherein the derivative of the acceleration of the pitching motion of the portion of the aircraft is calculated by:
    receiving a third signal indicative of the acceleration of the pitching motion of the aircraft from a sensor;
    applying a kinematic equation to the third signal to transform the indication of the acceleration of the pitching motion of the aircraft to indicate the acceleration of the pitching motion of the portion of the aircraft; and
    taking a derivative of the acceleration of the pitching motion of the portion of the aircraft.

11. The method of claim 9, wherein the portion of the aircraft is a nose landing assembly and the threshold is a positive value.

12. The method of claim 9, wherein the threshold is a negative value.

13. A system for sensing a force applied to an aircraft comprising:
    a sensor; and
    a processor operative to receive a signal indicative of an acceleration of a motion of the aircraft, apply a kinematic equation to the first signal to transform the indication of the acceleration of the motion of the aircraft to indicate an acceleration of a motion of a portion of the aircraft, calculate a derivative of the acceleration of the motion of the portion of the aircraft, determine whether the derivative of the acceleration of the motion of the portion of the aircraft exceeds a threshold, output an indication that a force has been applied to the portion of the aircraft responsive to determining that the derivative of the acceleration of the motion of the portion of the aircraft exceeds the threshold, wherein the force applied to the portion of the aircraft is a weight on wheel force indicating landing of the aircraft;
    the processor resetting the indication that the force has been applied to the portion of the aircraft upon receiving a takeoff signal, the takeoff signal indicating the aircraft has taken flight.

14. The system of claim 13, wherein the derivative of the acceleration of the motion of the portion of the aircraft is the derivative of the acceleration of a vertical motion of the portion of the aircraft and the threshold is associated with the vertical motion of the portion of the aircraft.

15. The system of claim 13, wherein the derivative of the acceleration of the motion of the portion of the aircraft is the derivative of the acceleration of a rolling motion of the portion of the aircraft and the threshold is associated with the rolling motion of the portion of the aircraft.

16. The system of claim 13, wherein the derivative of the acceleration of the motion of the portion of the aircraft is the derivative of the acceleration of a pitching motion of the portion of the aircraft and the threshold is associated with the pitching motion of the portion of the aircraft.

17. The system of claim 13, wherein the portion of the aircraft is a landing assembly.

18. A system for sensing a force applied to an aircraft comprising:
    a sensor; and
    a processor operative to receive a signal indicative of an acceleration of a motion of the aircraft, apply a kinematic equation to the first signal to transform the indication of the acceleration of the motion of the aircraft to indicate an acceleration of a motion of a portion of the aircraft, calculate a derivative of the acceleration of the motion of the portion of the aircraft, determine whether the derivative of the acceleration of the motion of the portion of the aircraft exceeds a threshold, output an indication that a force has been applied to the portion of the aircraft responsive to determining that the derivative of the acceleration of the motion of the portion of the aircraft exceeds the threshold;
    wherein the derivative of the acceleration of the motion of the portion of the aircraft includes the derivative of the acceleration of a vertical motion of the portion of the aircraft and the threshold is associated with the vertical motion of the portion of the aircraft;
    wherein the derivative of the acceleration of the motion of the portion of the aircraft includes the derivative of the acceleration of a rolling motion of the portion of the aircraft and the threshold is associated with the rolling motion of the portion of the aircraft;
    wherein the derivative of the acceleration of the motion of the portion of the aircraft includes the derivative of the acceleration of a pitching motion of the portion of the aircraft and the threshold is associated with the pitching motion of the portion of the aircraft.

* * * * *